United States Patent [19]

Scott

[11] 4,290,613

[45] Sep. 22, 1981

[54] POSITIVE CLEARANCE RADIAL FACE SEALS

[75] Inventor: Peter A. J. Scott, Brighouse, England

[73] Assignee: Associated Engineering Limited, Warwickshire, England

[21] Appl. No.: 77,433

[22] Filed: Sep. 20, 1979

[30] Foreign Application Priority Data

Sep. 22, 1978 [GB] United Kingdom ............... 17715/78

[51] Int. Cl.³ .............................................. F16J 15/34
[52] U.S. Cl. .................................... 277/96.1; 277/96.2
[58] Field of Search ..................... 277/3, 27, 96, 96.2, 277/81, 96.1

[56] References Cited

U.S. PATENT DOCUMENTS 3,529,838  9/1970  Singleton .............................. 277/27
4,195,852  4/1980  Roley .................................. 277/96.2

Primary Examiner—Robert I. Smith
Attorney, Agent, or Firm—Biebel, French & Nauman

[57] ABSTRACT

A positive clearance radial face seal characterized in that at least one of its two opposed sealing faces comprises a pressure-deflectable elastic or elastically loaded element which deflects, in steady state operating conditions, to provide a clearance between the sealing faces which converges in the radial direction towards the downstream zone of the seal, the deflection changing with variations in the operating conditions in a manner tending to restore the steady state clearance.

16 Claims, 20 Drawing Figures

POSITIVE CLEARANCE RADIAL FACE SEALS

BACKGROUND OF THE INVENTION

1. Field of the Invention

This invention relates to positive clearance radial face seals for effecting a seal between relatively rotatable members, such as a shaft and a housing, to restrict or prohibit the leakage of a fluid from a first region at a relatively high pressure to a second region at relatively low pressure. The second region may be under vacuum, in which case the potential leakage may be from atmosphere to the vacuum region.

2. Description of the Prior Art

Positive clearance radial face seals are well known in the art and the technical problems involved in producing a satisfactory seal have been described in various papers including "Inherently stable high pressure face seals" by J. P. O'Donoghue and G. K. Lewis in (British Hydromechanical Research Association November 1969), and "A review of positive clearance radial face seals" by J. P. O'Donoghue (BHRA 1972).

Barrier or buffer face seals in which a buffer fluid is introduced into or extracted from the face seal at a point in the leakage path which would otherwise exist between the first and second regions, are also known. Such a barrier seal which ensures complete separation of the fluid to be sealed, for example for separating a toxic gas such as chlorine from the atmosphere, is described by H. Lindeboom in ASME Paper 67-PET-31 (September 1967).

Constructions of face seals are also described in British Pat. Specifications Nos. 1193,604 and 1263,693.

A face seal must have stability for satisfactory operation. A face seal operating by hydrostatic lift and using stepped or tapered face geometry to provide inherent stability of the clearance between the sealing faces of the seal has proved its practicability. Such face geometry has hitherto been provided by accurately machining a sealing face to a desired stepped or tapered configuration conforming to the operating conditions.

SUMMARY OF THE INVENTION

The present invention has for an object to provide a radial face seal which avoids the necessity of machining one sealing face to an accurately stepped or tapered form. Another object is to provide a radial face seal having increased stiffness of the film between the faces both in the axial displacement and tilting modes.

According to the invention, a positive clearance radial face seal is characterized in that at least one of its two opposed sealing faces comprises a pressure-deflectable elastic or elastically loaded element which deflects, in steady state operating conditions, to provide a clearance between the sealing faces which converges in the radial direction towards the downstream zone of the seal, the deflection changing with variations in the operating conditions in a manner tending to restore the steady state clearance. The deflectable element may produce a convergence of tapered or stepped configuration.

The face seal according to the invention provides, in operation, a continuous fluid film between the sealing faces which, is of a considerable stiffness and which, in steady state operation, prevents the sealing faces from contacting one another. The deflection of the deflectable element of one sealing face as a result of the alteration of the pressure distribution between the faces improves the stiffness of the fluid film (i.e. the rate of change of fluid film thickness in relation to load) between the faces compared with sealing faces having a fixed degree of taper of the same magnitude.

By means of the invention, the necessity of accurately machining a sealing face to a stepped or tapered form is avoided; both sealing faces may be machined radially flat, which is a relatively simple operation.

Moreover, the elastic deformation due to fluid pressure loads which occurs with face seals according to the present invention can be arranged to over-ride the fluid-dynamic effects due to thermal deformation of the parts; in other words, the seal is self-compensating for the effects of thermal distortion.

Face seals according to the invention may be used for restricting leakage of a fluid at high pressure to a zone of lower pressure or may also incorporate provision for introducing or extracting a buffer fluid from the flow passage to ensure complete separation of fluids which may be toxic, highly inflammable or otherwise dangerous if leaked.

BRIEF DESCRIPTION OF THE DRAWINGS

Embodiments of the invention will now be described by way of example, with reference to the accompanying figures, of which.

DESCRIPTION OF THE PREFERRED EMBODIMENT

Figure 1:
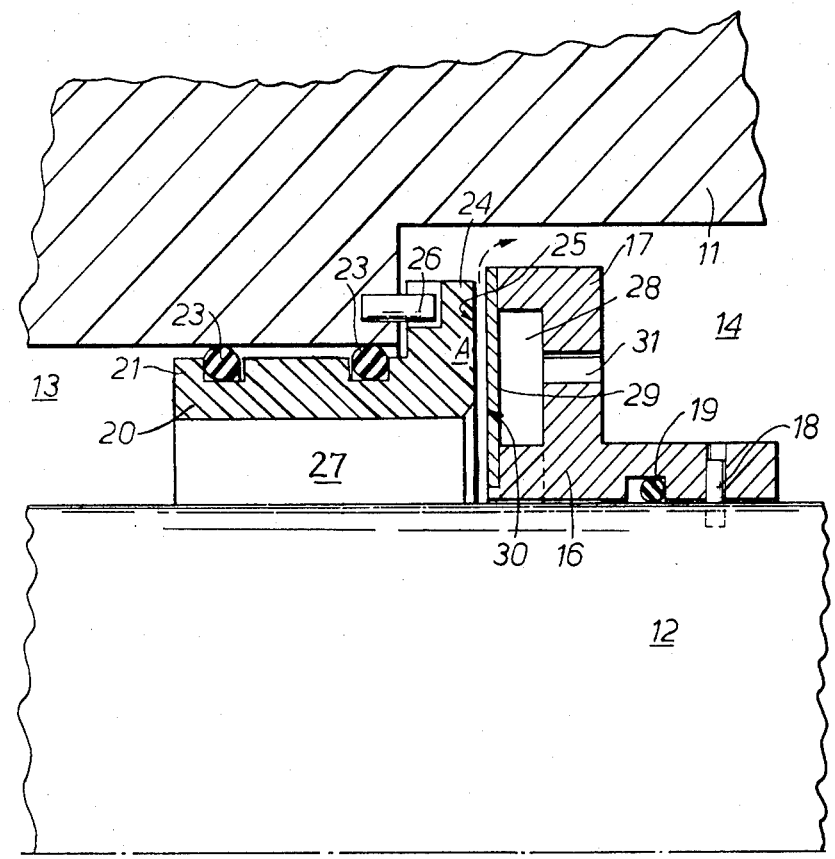
FIG. 1 is a general view of a first embodiment of face seal according to the invention.

The structure shown in FIG. 1 includes a housing 11 having a circular hole through which passes a rotatable shaft 12. Th seal assembly is intended to restrict the leakage of fluid contained in a first, high-pressure region 13, to a second, low-pressure region 14.

A collar 16, having a radial flange 17, is mounted on the shaft 12 to rotate with it. For this purpose a pin or key 18 is provided, and there is also a flexible sealing ring 19 compressed in a groove in the collar to stop the leakage of fluid between the shaft 12 and the collar 16.

The housing 11 is stepped. An annular backplate 20 comprising a cylindrical portion 21 and a radial flange 24, surrounds the shaft 12 and has its smaller diameter part 21 within and in sealed engagement with the smaller-diameter part of the housing 11 by means of two flexible sealing rings 23. The backplate is prevented from rotation relatively to the housing 11 by a pin 26 but is capable of limited axial movement relative thereto. The righthand face of the flange part 24 (as seen in FIG. 1) is flat and constitutes the stationary sealing face 25 of the seal. The backplate 20 has a central bore 27 in communication with the region 13, the radially outer periphery of the end of the bore 27 remote from region 13 forming the radially inner periphery of the sealing face 25.

The collar 16 and backplate 20 are relatively rotatable, and also axially moveable relative to one another. It will be appreciated that the high-pressure fluid in region 13 loads the backplate to the right as seen in Figure. If required, the backplate may also be spring-loaded in the same direction, by springs of low stiffness.

The left-hand face of collar 16, as seen in FIG. 1, is formed with a deep, wide, annular groove 28, which is closed by a thin, annular elastic metal element 29. The latter is received in a rebate in the collar at its inner diameter, and is secured to the collar, for example by screws near its outer periphery. The element 29 thus forms the other sealing face 30 to co-operate with face 25. The groove 28 is connected by a passage 31 to the low pressure region 14.

The sealing faces 25 and 30 are planar and may be lapped to a smoothness of the order of 0.2 micrometers RMS on both the homogeneous solid backplate and on the elastic element 29. The machining of the element 29 may produce a degree of "spring-back" so that the element is not necessarily precisely flat when installed. Thus the arrangement defines a pair of co-operating opposed sealing face areas, designated A.

Figure 2:
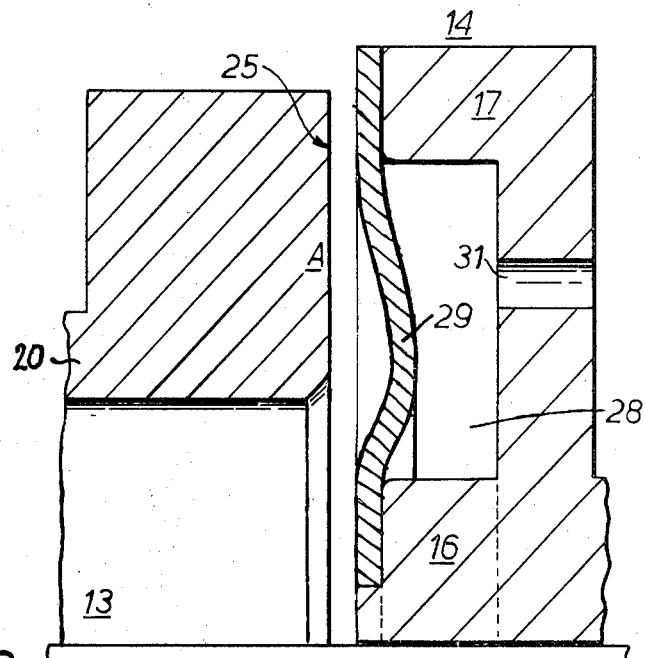
FIG. 2 is a view of part of FIG. 1 on a larger scale.

Since the pressure of the sealed fluid in region 13 is greater than that of the fluid in the low pressure region 14, there will be an outward flow of sealed fluid from the bore 27 over the face areas A. Because the bore 27 lies opposite to the radially inner part of groove 28 in the collar 16, an annular zone of high pressure acts on face 30, and because the pressure between face areas A will vary from the high pressure at the inner periphery to the low pressure at the outer periphery of areas A, the elastic metal element 29 will be caused to deflect, as indicated in FIG. 2, to produce an annular space over the sealing face areas A which converges in the outward direction with a tapering configuration.

The convergence of the clearance between sealing faces 25, 30, that is from the inner periphery of areas A to the outer periphery of areas A (which defines the minimum clearance) will be at most 10:1, and preferably will not exceed 3:1. Convergence is defined as the ratio of the clearance at the position of maximum clearance between opposed sealing face areas A to the minimum clearance between the opposed sealing face areas A. The minimum clearance between the faces 25, 30 in operation will not exceed 0.25 mm and preferably will not exceed 0.02 mm.

Thus if the minimum clearance in operation is 0.1 mm, then the maximum clearance (at the radially inner edge of face 25) will not exceed 1.0 mm, and preferably will not exceed 0.3 mm. It will be noted that the chamfer between bore 27 and face 25 is not part of the sealing face, nor is the part of face 30 which is of greater diameter than face 25. Instead of the chamfer, there could be a step or rebate at the inner periphery, which would not form part of the sealing face. Further, there might be a rebate at the outer periphery of face 30, for example to accommodate bolts or the like, which equally would not form part of the sealing face.

Figure 3:
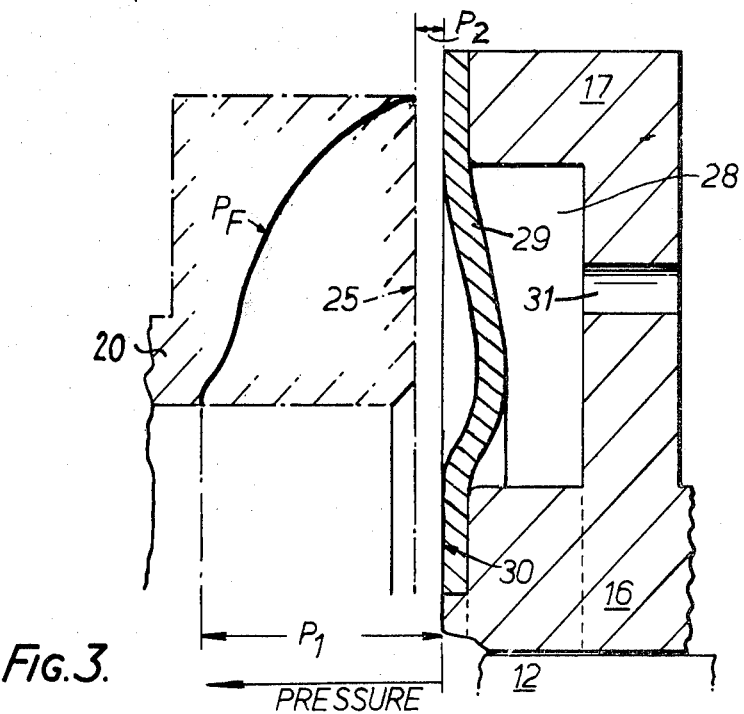
FIG. 3 is a diagram of the pressure variation over the sealing faces of FIG. 2.

The fluid pressure acting on the sealing face 25 of the backplate under steady state conditions is shown by trace $P_F$ in FIG. 3; the sealed fluid pressure in region 13 is designated $P_1$ and the pressure in the second region 14 is designated $P_2$. This produces a hydrostatic load acting to move the backplate 20 to the left in FIG. 1, in opposition to the load afforded by the pressure of the sealed fluid in region 13 and the springs (if any) acting on the left-hand end of the smaller diameter part 21 of the backplate. Thus, provided that the stiffness of the fluid film, (i.e. the rate of change of fluid film thickness in relation to load) between the sealing faces 25, 30 is sufficient on axial movement of the collar 16 relative to the backplate 20 (e.g. due to lack of squareness of the collar on the shaft) to overcome inertia and damping forces on the backplate, the clearance between the outer periphery of areas A of the backplate and the element 29 will govern the relative positions of the backplate 20 and the collar 16.

Figure 4:
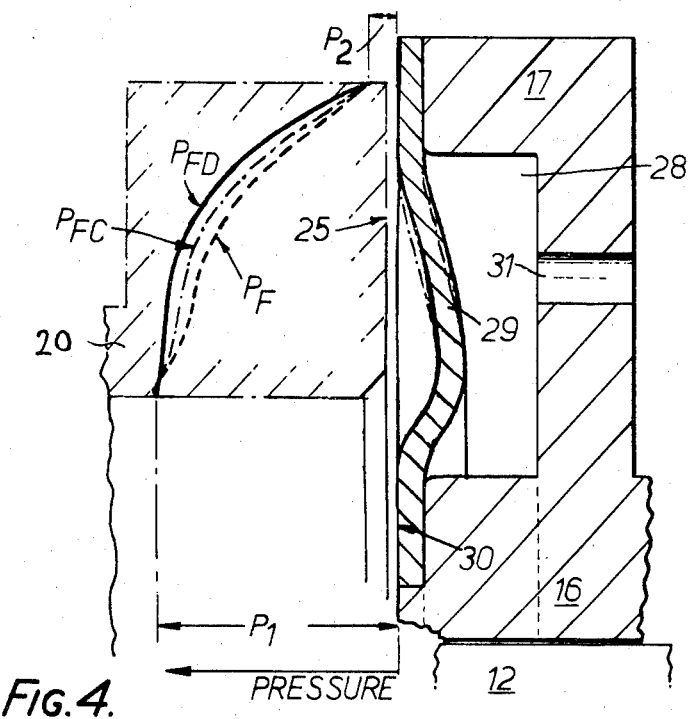
FIG. 4 is a diagram showing the effects of a reduction of clearance between the sealing faces of the pressure variation.

Referring to FIG. 4, there is shown the effect of a local decrease in the clearance between sealing faces 25, 30 (i.e. the effect of the collar 16 and backplate 20 approaching one another either bodily, or at one point around the circumference due to tilting). This produces an increase in pressure $P_{FC}$ over the appropriate co-operating sealing face areas A of faces 25, 30, due to increased convergence. This increase in pressure in turn causes the elastic element 29 to deflect further into groove 28 (as shown in FIG. 4) to produce a tapered clearance of greater convergence. The pressure over areas A therefore increases further, as shown by line $P_{FD}$, thus increasing the load tending to separate the sealing faces 25, 30. The load acting on the left-hand end of the backplate, which tends to decrease the clearance, remains unchanged, and accordingly the clearance tends to return to its original value. Thus by the use of the elastic element 29, the essential criterion of a tendency towards stability of the clearance between the sealing faces is fulfilled.

Figure 5:
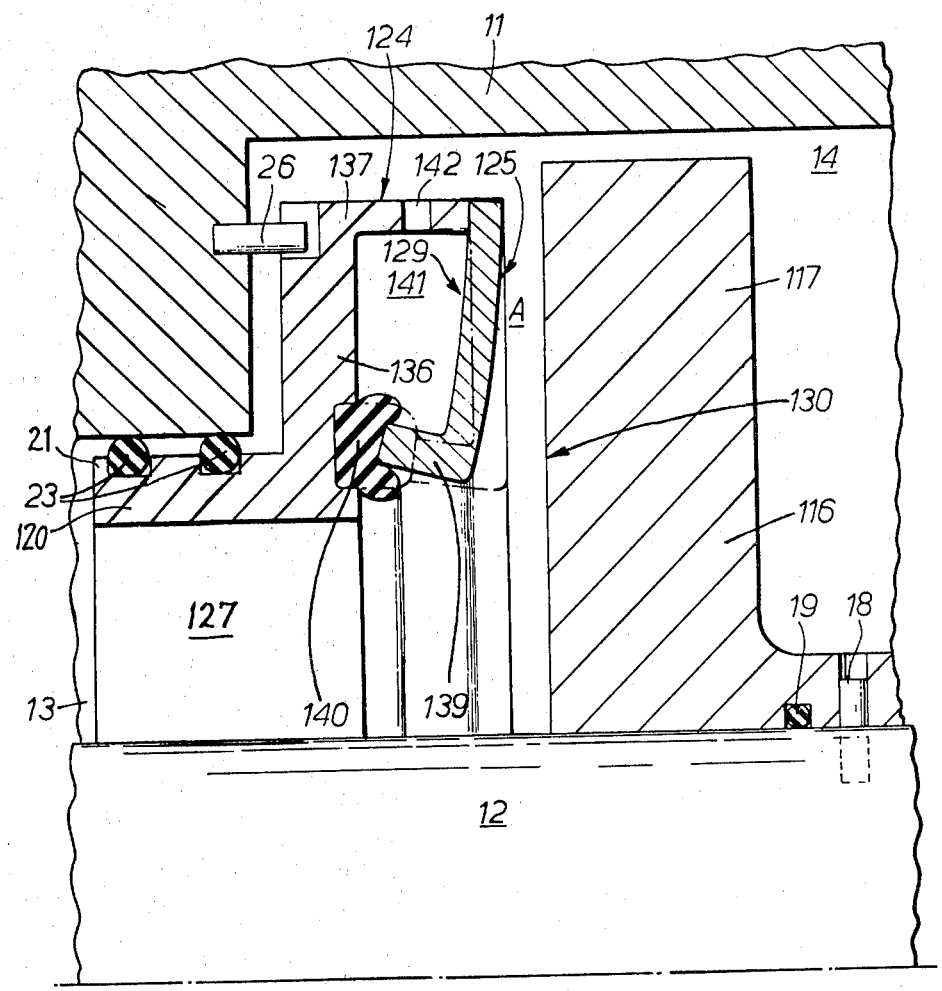
FIG. 5 shows an alternative form of face seal according to the invention under operating conditions.

An alternative arrangement is shown in FIG. 5, in which an annular elastic element 129 forms part of a backplate 120 having a bore 127, the elastic element having a sealing face 125, and the collar 116 having a flat radial sealing face 130 on its flange 117, forming a pair of face areas A.

The larger diameter part 124 of the backplate is formed with a radial flange 136, which at its outside diameter has an outer cylindrical part 137 extending towards sealing face 130. The outer periphery of the annular element is secured to the free end of part 137; the element 129 extends inwardly therefrom and when not subjected to pressure its face 125 lies in a radial plane having been machined flat during manufacture. However, in operation the element 129 flexes, its inner periphery diverging away from the opposed sealing face 130. The inner periphery of the element 129 is formed with a cylindrical flange 139, the free end of which is in sealing engagement with the base of flange 136 through a flexible sealing ring 140. The enclosed space 141 thus formed is connected to the low-pressure region 14 through holes 142. Thus in operation the flow passage between the sealing face areas A becomes tapered and converges in the direction of fluid flow between them. The structure functions in the same way as the embodiment of FIG. 1. If the minimum clearance at the outer periphery of face 125 is reduced, the pressure between the sealing faces increases, the inner periphery of element 129 deflects to the left, and a greater end load is applied to the right-hand end of the backplate 120. Since the left-hand end load on the backplate remains unaltered, the backplate moves to the left, restoring the clearance.

Figure 6:
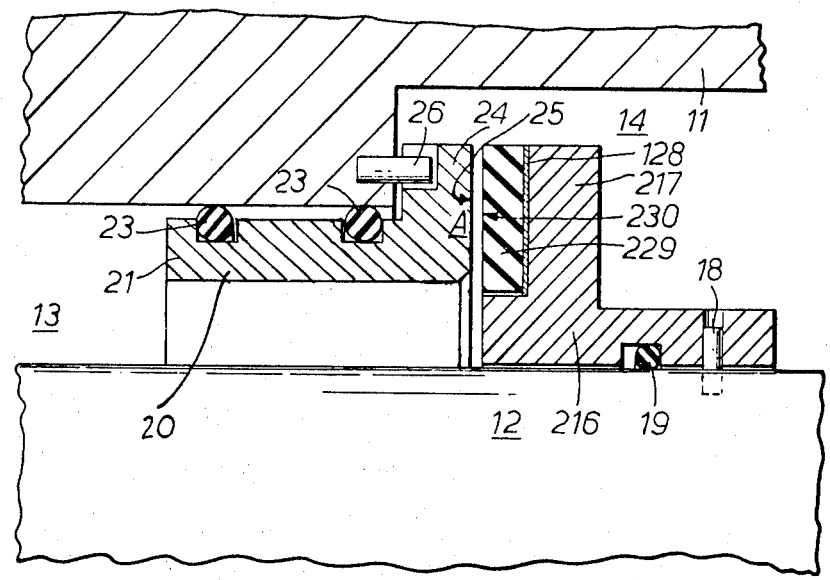
FIG. 6 shows another embodiment of face seal of the invention.
Figure 7:
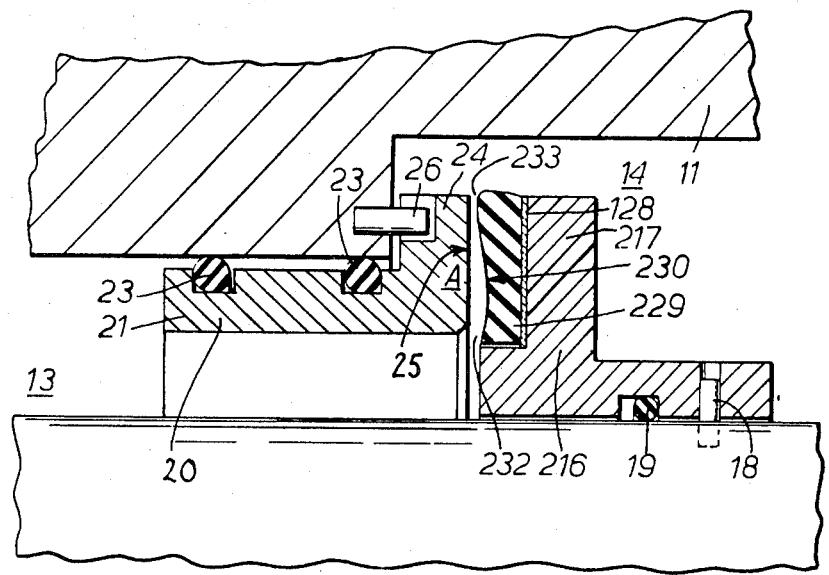
FIG. 7 shows the seal of FIG. 6 under operating conditions.

Another embodiment is shown in FIGS. 6 and 7. In this case the backplate 20 is the same as shown in FIG. 1. The elastic element comprises a ring 229 of a compliant elastomer set into a rebate 128 in the collar 216. When uncompressed, the ring 229 is of rectangular cross-section and its sealing face 230 is radial.

During steady state operation, the pressure distribution between the opposed sealing face areas A is similar to that shown in FIG. 3, and when the ring 229 is subjected to this pressure distribution the thickness of the ring varies from a minimum opposite the internal periphery of the sealing face 25 to a somewhat greater value at its own periphery 232 and, in the opposite radial direction, to a maximum at its outer periphery 233, as shown in FIG. 7. The clearance between the sealing faces 25, 230 is thus convergent in the direction of fluid flow over face areas A between bore 27 and the outer periphery of face 25.

Deformation of the ring 229 may cause its outer diameter to increase, as shown in FIG. 7. However, since the sealing face 25 of the backplate 20 is radial, this ensures that, if the outer periphery of ring 229 is of greater diameter than the face 25, the minimum clearance occurs at the outer diameter of the face 25.

Should a change in the minimum clearance occur the deflection of the front face 230 of ring 229 changes, like the elastic element 29 of FIGS. 1 to 4, and changes the convergence in a sense tending to restore the clearance to its original value, resulting in stable conditions of operation.

Figure 8:
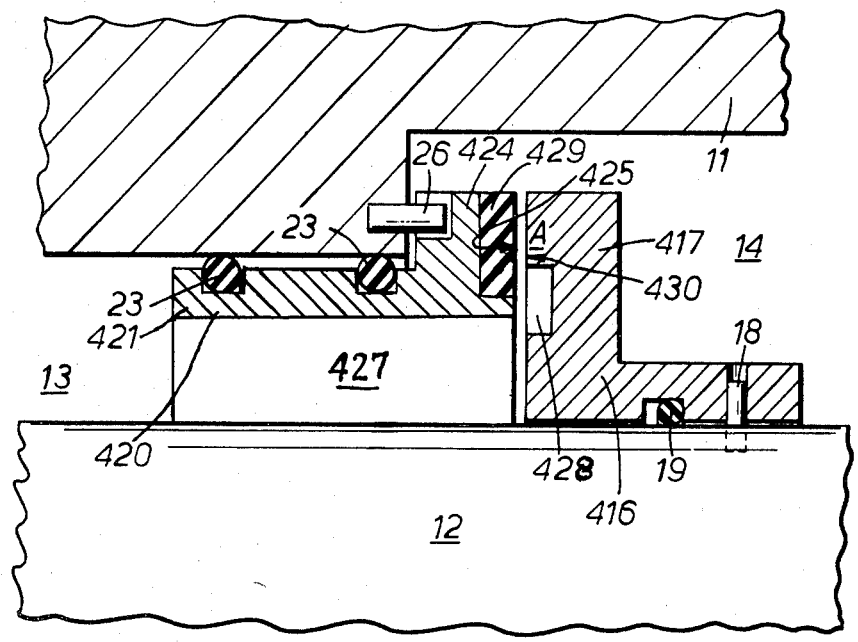
FIG. 8 shows another embodiment of face seal according to the invention.

FIG. 8 shows a modification in which the flange portion 417 of collar 416 is formed with a groove 428 which is in communication with the bore 427 of the backplate 420 and the sealing face 425 of the backplate is formed with a rebate in which is bonded an elastic element 429 in the form of a thick ring of an elastomer. This ring, at its inner periphery, overlaps the annular groove 428 and thus the element 429 will be deflected and deformd, like the elastic element 229 of FIGS. 6 and 7; by the pressure between the sealing faces 425, 430, the maximum deflection being near its inner periphery. In this embodiment the opposed sealing face areas A extend from the outer periphery of groove 428 to the outer edge of flange 417 and element 429.

Figure 9:
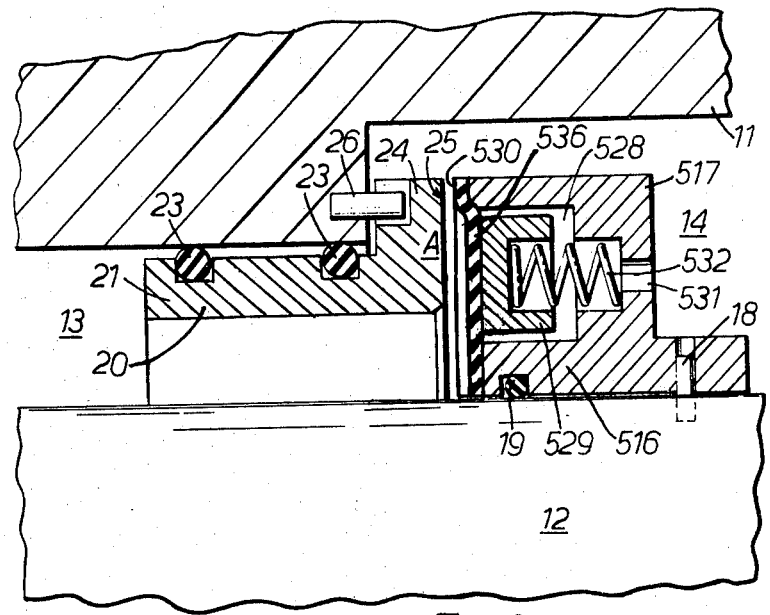
FIGS. 9 to 14 show further embodiments of face seal according to the invention, under operating conditions.

In the embodiment of FIG. 9 the passage between the sealing faces 25 and 530 is, during operation, stepped rather than tapered. In this embodiment the backplate 20 is the same as in FIG. 1. The collar 516 has its radial flange 517 formed with a wide annular groove 528 which receives an annular piston 529 which is spring-loaded by a series of coil spring 532 disposed around the groove. The piston 529 constitutes a deflectable element. The arrangement is such that the springs 532 do not cause the end face of the piston 529 to project beyond the end face of the flange 517 which surrounds the piston. A mechanical stop may be provided if desired.

An annular member 536, of flexible material for example of P.T.F.E., is secured to the end face of the piston and also to the adjacent faces of the flange 517 an collar 516 to prevent leakage of fluid from the high pressure region 13 between the piston 529 and the walls of the groove 528 and thence by way of the vent holes 531 to the low pressure region 14. The seal member 536 forms the sealing face 530, which, when not under fluid pressure, provides a sealing face area A which is flat.

During operation, there is a pressure gradient between face areas A from the high-pressure region 13 to the low-pressure region 14. The average pressure acting through seal member 536 on the end face of piston 529 will be greater than the pressure in space 14, and thus causes the piston 529 to deflect against springs 532 so that the passage between the opposed face areas A assumes a stepped configuration and becomes convergent in the direction of fluid flow.

A change in the minimum clearance between the sealing faces will produce a change in the deflection of the piston in a manner tending to restore the minimum clearance to its stable state value. With this embodiment, the piston 529 may not deflect at one point around its circumference when relative tilting of the collar 516 and backplate 20 occurs. Nevertheless, a restoring couple will be generated due to the greater convergence of the flow passage at the location where the collar 516 and backplate 20 approach one another and the lesser convergence at the diametrically opposite location of the seal.

Figure 10:
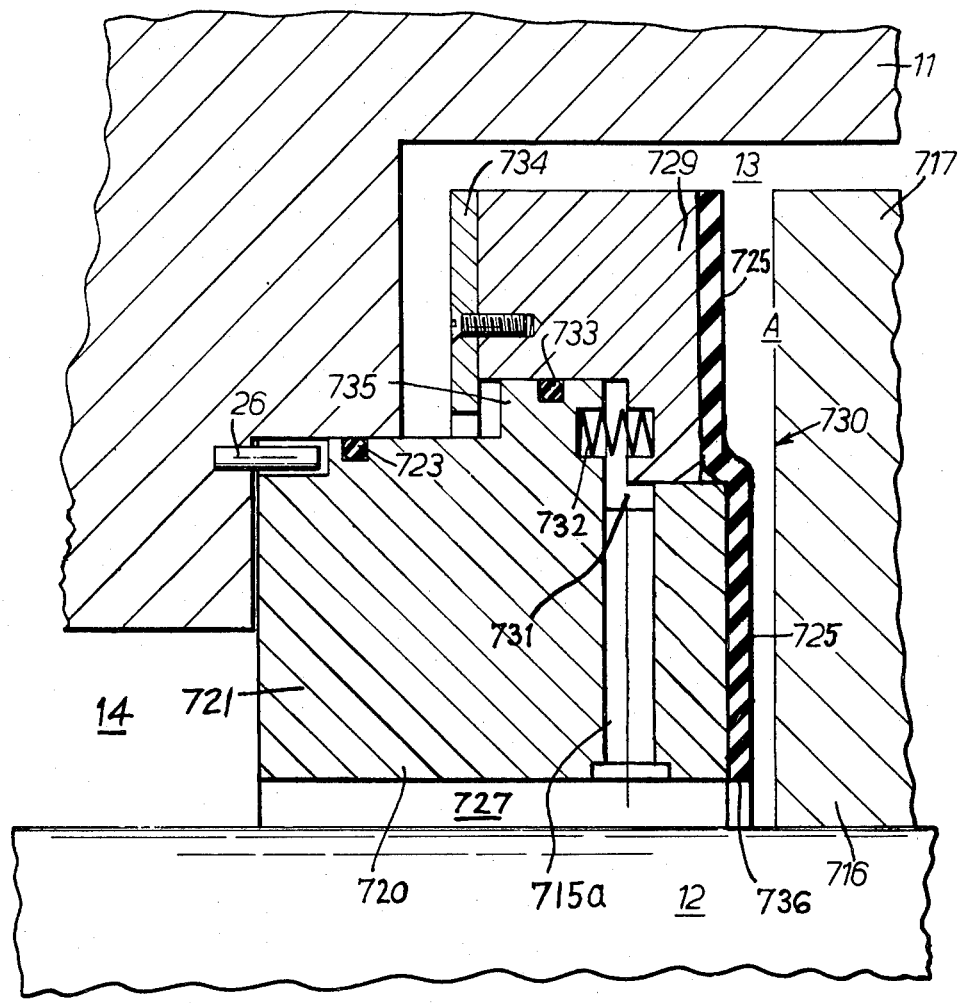

Referring now to FIG. 10, the collar 716 has a radial flange 717 providing a sealing face 730 and may be exactly as described with reference to FIG. 5. In this embodiment the high pressure sealed fluid region 13 communicates with the outer periphery of the sealing faces, the low pressure region 14 communicating with the inner periphery of the sealing faces via the bore 727 of the backplate 720. Mounted on the radially-inner part 721 of the backplate and surrounding it, is an annular piston 729. A seal 723 is provided between part 721 and the housing 11, together with a pin 26 for preventing its rotation. The space 731 between part 721 and piston 729 is connected, by a passage 715a to bore 727, to be at the low pressure of region 14. A series of coil springs 732 are housed in facing pockets in parts 721, 729, within space 731, and load the annular piston 729 to the right. The stepped inner periphery of the piston is slidable on a co-operating cylindrical face of the part 721 and sealed against leakage therebetween by means of an annular seal 733. The annular piston 729 has a stop plate 734 attached to its which abuts a flange 735 on part 721 to limit movement of the piston 729 to the right.

The right-hand end-faces of parts 721 and of piston 729 are flat and coplanar when stop plate 734 abuts flange 735. An annular seal member 736 is secured across these faces and constitutes one of the sealing face areas A.

In operation there will be a flow of fluid inwards between the opposed face areas A from the high-pressure region 13 to the low-pressure region 14.

There will be a pressure gradient between face areas A from a maximum pressure at the outer periphery to a minimum at the inner periphery. The high pressure near the outer periphery will cause the piston to move to the left, compressing springs 732, and causing seal 736 to adopt a stepped form. Since, in operation, it is arranged that there is always a greater clearance between the part of the opposed face areas A formed by the seal 736 where it is secured to the piston 729 that between that part of the face areas A formed by the seal where it is secured to the inner part 721 of the backplate, the latter part will control the minimum clearance between the sealing faces 725, 730. The piston 729 constitutes a deflectable element which when it deflects under fluid pressure will increase the gap between the outer part of face areas A if the minimum clearance decreases, thus increasing the pressure between these face areas, and affording a separating force to restore the original gap.

The area on the right-hand side of piston 729, which is subjected to a lower mean pressure than the left-hand side of the region of stop plate 734, is so dimensioned in relation to the area on its left-hand side, and taking account of the low pressure in space 731 acting on the inner part of the left-hand side of the piston, that the net force due to the pressures tends to move piston 729 to the left against springs 732.

Thus in this arrangement also the clearance between the sealing faces 725, 730 is controlled, and flow from the region 13 at the greater pressure to region 14 at the lower pressure is restricted.

Figure 11:
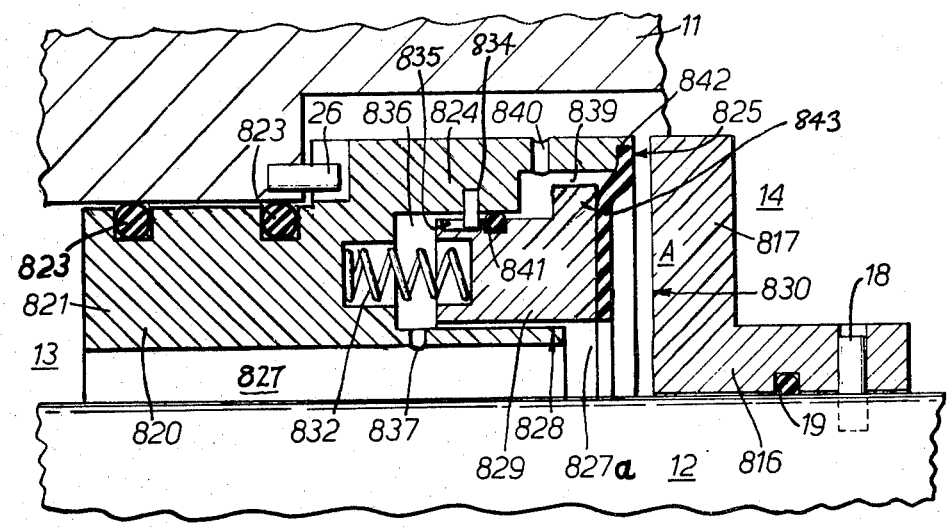

FIG. 11 shows another embodiment of face seal of which the passage between the sealing faces 825 and 830 is, again, in operation, stepped. In this embodiment, the collar 816 on the shaft 12 has a plane radial flange 817 affording a sealing face 830.

The backplate 820 has a smaller-diameter part 821 with a bore 827 and which seals against the housing 11 by seals 823. The larger-diameter part 824 of the backplate provides a part of a sealing face 825. An annular zone 827a is in communication with the bore 827 and a pair of opposed sealing face areas A are located radially outwardly of the zone 827a.

The deflectable element is again formed by an annular piston 829 loaded by a series of coil springs 832, an annular seal member 842 being secured to the right-hand face of the piston 829 and in a rebate in the right-hand end face of the larger diameter part 824. The piston 829 is of stepped cross-section, is housed in a stepped annular groove 828 and the springs 832 are located in suitable facing pockets in the larger diameter part 824 of the backplate and the piston 829 respectively. The seal member 842, which is preferably of P.T.F.E., affords a sealing face 825 which, when not under fluid pressure, is flat. It is arranged that the right-hand face 825 (as seen in FIG. 11) of the seal on the piston 829 never stands proud of the corresponding face 825 of the seal on part 824 of the backplate during operation, either by so arranging the pressure and spring forces, or if required by providing a mechanical stop consisting of co-operating stop members 835, 834 provided respectively on the piston 829 and on larger diameter part 824 of the backplate.

The smaller-diameter part 836 of groove 828 is connected by holes 837 to the bore 827 and thus the left-hand side of the smaller-diameter part of the piston 839 is loaded by the high pressure of region 13. The larger-diameter part 839 of the groove is connected by holes 840 to the region 14 at low pressure and thus the left-hand side of the larger diameter part 843 of the piston is subjected to low pressure.

A seal 841 is provided between the smaller-diameter part of the piston 829 and the corresponding part of the groove 836, to prevent leakage from within part 836 to the region 14. The part of seal 842 between the larger-diameter part 834 of the piston and the corresponding part 824 of the backplate prevents leakage of fluid from the high pressure region 13 between the piston 829 and part 824 to the region 14 via space 839 and hole 840.

This arrangement provides a pair of opposed sealing face areas A defining, in operation, a flow passage of variable stepped profile and convergent in the direction of flow. There will thus be a pressure gradient over face areas A between the bore 827 and the region 14 of low pressure at the outer periphery of faces 825, 830. It will be arranged that the minimum clearance occurs between the outer periphery of these faces 825, 830, and thus controls the separation of the faces.

Figure 12:
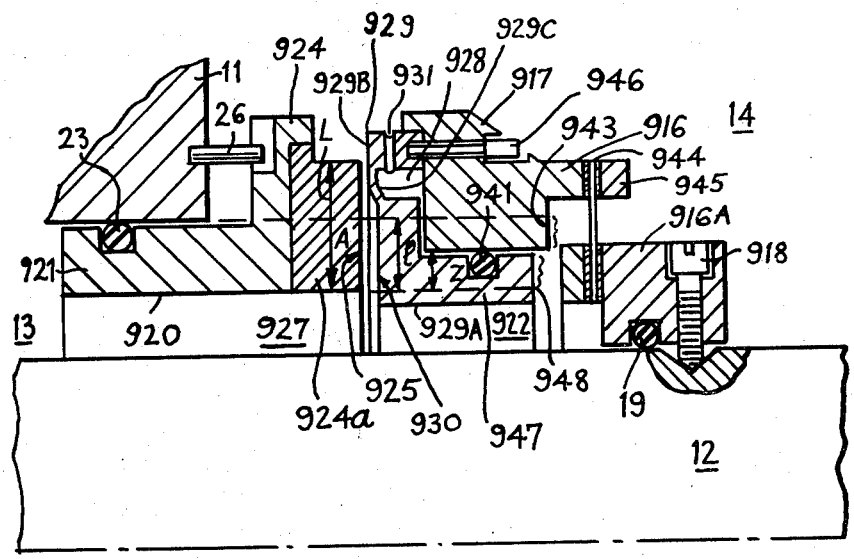

Referring to FIG. 12, the backplate 920 has a radially inner part 921 which is sealed within the housing 11 by means of an annular sealing ring 23 and is restrained from rotation relative to the housing by means of pin 26 which engages in the flange part 924. A ring 924a is part of the backplate and forms a sealing face 925 which extends from the outer periphery of a bore 927 in the backplate to the outer edge of ring 924a.

A collar constituted by a rotor head assembly comprising a ring 916 formed with a step 943, and a member 929 secured thereto by bolts 946 and constituting a deflectable element is driven from the shaft 12 by means of an annular membrane 944 fixed to an extended portion 945 of the ring 916 and to a mounting collar 916A secured to the shaft by a bolt 918 and sealed to the shaft by the annular sealing ring 19. The member 929 is formed with a wide annular groove 928 by the rigid inner and outer rings 929A and 929B respectively, interconnected by an elastic element 929C, and is closed by the main body 917 of the ring 916. The left hand face of member 929, when not under fluid pressure, is flat and forms a sealing face 930. The inner ring 929A has a cylindrical portion 947 which is sealed against the ring 916 by a sealing ring 941.

The portion 947 has a central bore 922 in communication with the high pressure in bore 927 whereby the step 943 of ring 916 and end face 948 of portion 947, and the membrane 944 are exposed to the high pressure of region 13. The groove 928 is in communication with the low-pressure region 14 via holes 931. Thus only a low pressure acts on the right-hand face of the elastic element 929C. Since the ring 916 is mounted by means of the membrane 944 and since the right-hand face of step 943 and face 948 are exposed to high pressure, the ring 916 is hydraulically loaded to the left. Moreover, the high pressure also acts on the part of membrane 944 between ring 916 and collar 916A. The net load acting to the left on the right-hand end of ring assembly 916, 929 is arranged, by appropriate selection of areas, to be equal to the load acting to the right on the left-hand end of the backplate 920.

The areas are selected as follows:

Let L be the radial dimension corresponding to the area A of the co-operating sealing faces 925, 930.

Let l be the radial dimension corresponding to the net area of the backplate 920 exposed to the high pressure, in region 13, and tending to load the seal face 925 to the right. Further, in accordance with a feature of the invention, l must also be the radial dimension corresponding to the equivalent net area on which the high pressure acts to exert a force on ring 916 and portion 947 to load the seal face 930 to the left. The term 'equivalent' is used to allow for the fact that the force acting to the right on ring 916 via membrane 944 is balanced by the force acting to the left on the area of step 943 not included in the area defined by dimension l.

Let z be the radial dimension corresponding to the net area of the face 948 on which the high pressure in bore 922 acts to the left on portion 947.

Then, in accordance with a feature the invention, $L>l>z$, and preferably l is approximately two thirds of L and z is approximately half of L, to maximize the stiffness of the fluid film between the sealing face areas A.

The force due to the pressure acting on the net area represented by dimension z loads part 929A to the left. Since $l>z$, $l-z$ is positive, and represents the force acting through ring 916 to load that part of the outer ring 929B, which forms part of the co-operating sealing face areas A, to the left. Since there is a reduction of pressure from the high pressure of region 13 at the inner periphery of the sealing face areas A to the low pressure of region 14 at the outer periphery, and since the axial forces are in equilibrium, there will be an anti-clockwise moment exerted on the elastic element 929C and the clearance between face 930 of the outer ring 929B and face 925 of ring 924, during operation, will therefore be less than that between face 930 of inner ring 929A and face 925. Moreover, the extent of deflection is governed solely by pressure loads and the stiffness of the elastic element 929C and no additional springs are required. The opposed sealing face areas A are formed by the entire sealing face 925 of the ring 924a and by that part of the sealing face 930 which is immediately opposite and does not extend beyond the internal and external diameters of the sealing face 925.

Figure 13:
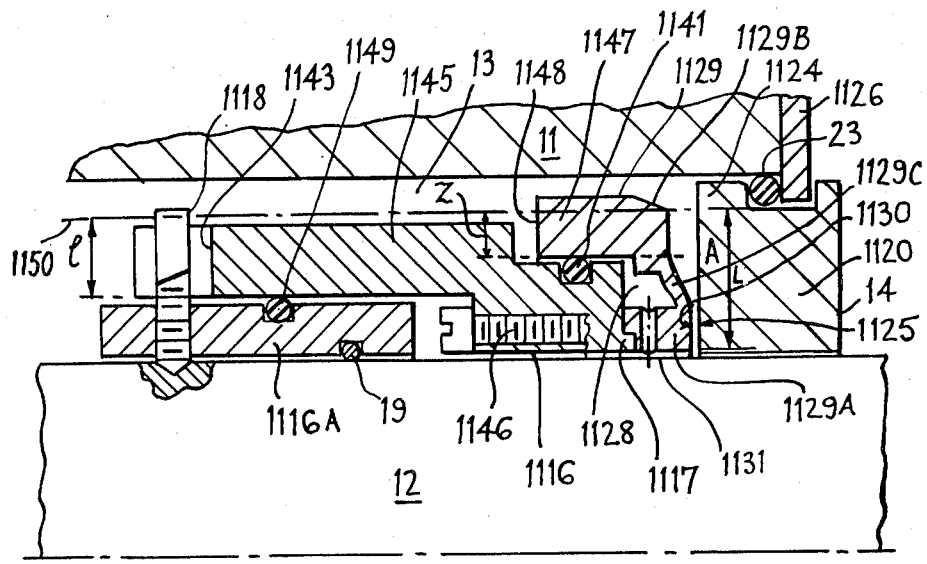

In FIG. 13, the face seal is mounted inside the housing 11 and the direction of flow from the high pressure region 13 towards the low pressure region 14 is radially inwards towards the shaft 12, i.e. in the opposite direction to that of FIG. 12. This embodiment is similar in some respects to that of FIG. 12, the collar 1116 being mounted to rotate with the shaft 12 and to be capable of limited axial movement with respect thereto, by means of a mounting member 1116A secured to the shaft by a screw 1118, and the backplate 1120 being restrained from rotation relatively to the housing by means of a pin 1126. The backplate 1120 is sealed to the housing by the annular sealing ring 23 and is capable of limited axial movement with respect thereto. The larger diameter part 1124 of the backplate 1120 provides a sealing face 1125. The mounting part 1116A is sealed to the shaft 12 and to an extended, larger diameter portion 1145 of the collar 1116 by annular sealing rings 19 and 1149 respectively. The collar 1116 has a member 1129 constituting a deflectable element and providing a sealing face 1130, which, when not under fluid pressure, is flat, and which constitutes with that part of the sealing face 1125 which is opposite to it, two opposed sealing face areas A. The member 1129 has inner and outer rigid rings 1129A and 1129B respectively, interconnected by an elastic element 1129C. The ring 1129A is fixed to the part 1117 of the collar as by bolts such as 1146. The member 1129 is formed, opposite elastic element 1129C, with a wide annular groove 1128 which is in communication with the low pressure region 14 through a passage 1131 and is closed by the collar part 1117 and sealed against the high pressure of region 13 by means of an annular sealing ring 1141 interposed between a cylindrical portion 1147 of the ring 1129B and the collar part 1145.

The collar 1116 is subjected to a pre-load determined by the expression $L>l>z$, referred to previously in connection with FIG. 12, these dimensions being taken from an axial line 1150 representing the external diameter of the sealing face areas A. The reference z represents a pre-load on the pressure face 1148 of the cylindrical portion 1147 of ring 1129B and $l-z$ is a force which acts on the pressure face 1143 of the collar portion 1145, thus splitting the forces transmitted to the sealing face areas A generated by the high pressure of region 13, acting on the collar. In operation, the elastic element 1129C of the member 1129 deflects as shown to provide a passage which is radially inwardly convergent in the direction of flow from the high pressure region 13 towards the low pressure region 14.

A feature of the invention consists in forming at least one of the sealing faces of a material which is abradable or susceptible to wear without serious damage. A material which is susceptible to wear is carbon. If only one face is formed of such material, the other sealing face may be formed of a wear-resistant material such as a suitable hard metal or ceramic. By adopting this feature of the invention imperfections in the manufacture, assembly and operation of the seal can be compensated for by wearing the sealing face or faces to the correct shape by a "running in" operation. This feature of the invention is incorporated in the embodiment of FIG. 14 to which reference will now be made.

Figure 14:
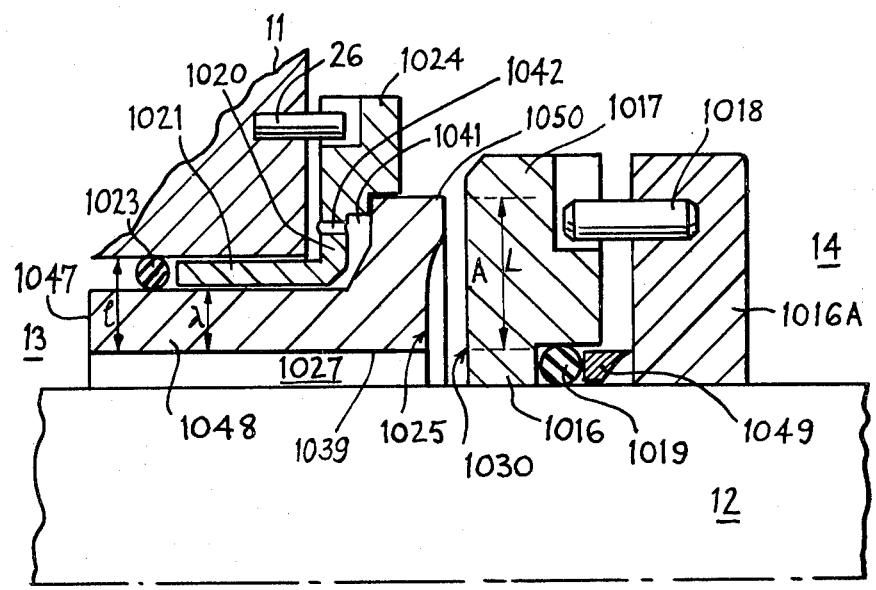

In FIG. 14, a collar 1016 having a radial flange 1017, is mounted on the shaft 12 to rotate therewith by means of a pin or key 1018 fixed to a mounting member 1016A secured to the shaft 12. The collar 1016 is sealed with respect to the shaft 12 by an annular sealing ring 1019 to stop leakage of fluid from region 13 to region 14 between the shaft 12 and the collar 1016, and is mechanically loaded towards the left (as seen in the Figure) by means of an annular ring 1049 which acts between the sealing ring 1019 and mounting member 1016A.

An annular backplate 1020, having a central bore 1027 in communication with the high-pressure region 13, surrounds the shaft 12, and is of substantially L-shaped cross-section with its smaller diameter part 1021 projecting into the annular gap between the housing 11 and shaft 12. Within the backplate 1020 is an L-section deflectable element in the form of a carbon ring 1039, which is supported axially and located radially at its outer periphery by the backplate 1020, and which has a cylindrical extension 1048 capable of sliding within part 1021 of the backplate. The carbon ring and backplate are also interconnected to prevent relative rotation. The collar 1016 and backplate 1020 are relatively rotatable, and also axially moveable relative to one another. The backplate 1020 has a larger diameter part 1024 in which a pin 26 engages to restrain rotation of the backplate with respect to the housing but the backplate is capable of limited axial movement relative thereto. It will be appreciated that the high-pressure fluid in region 13 loads the backplate to the right as seen in the Figure. The radial flange 1017 affords a sealing face 1030 of which the part extending radially inwardly of the outer periphery of deflectable element 1039 constitutes one of a pair of opposed co-operating sealing face areas A. The element 1039 presents a sealing face 1025 which constitutes the other of the pair of opposed sealing face areas A. The cylindrical extension 1048 of the element 1039 projects into the housing 11 for a greater distance than the backplate portion 1021, providing a seating for a sliding seal 1023 which seals both the backplate 1020 and extension 1048 to the housing 11 and thus also provides a seal between backplate 1020 and extension 1048. The extension 1048 has a bore 1027 therein communicating with the high-pressure region 13. The ring 1039 has a flange 1050 which is capable of deflection as a result of the pressures acting on its right-hand and left-hand faces (as seen in the Figure). There is an enclosed space 1041 between the right-hand face (as seen) of the portion 1024 of the backplate and the left-hand face of the flange 1050 which is in communication with the low-pressure region 14 through holes 1042.

In the embodiment illustrated in FIG. 14, the sealing face 1025 on the ring 1039 is normally flat and the sealing face 1030 on the collar 1016 is machined flat, e.g. by lapping, and is made of a wear-resistant material, e.g. a hard metal or ceramic. Initially the sealing face 1030 is allowed to contact the sealing face 1025 during a "running-in" operation which wears and beds-in. Thereafter, the pressures are such that in operation the flange 1050 deflects and provides a passage between the co-operating sealing face areas A formed by the sealing faces 1025, 1030, which is convergent in the direction of flow and has the minimum clearance between the sealing faces at the downstream end of the convergent portion. Thus the sealing face 1025 might be termed a self-generating face.

In practice, the maximum clearance between the co-operating sealing face areas A (in this case at the inner radius), when installed but not loaded, must be at least as great as, and preferably greater than, the minimum clearance (in this case at their outer radius)—i.e. the annular zone or channel between the sealing face areas is parallel, or converges in this example in the radially outward direction).

Since the pressure of the sealed fluid in region 13 is substantially greater than that of the fluid in the low-pressure region 14, there will be an outward flow of sealed fluid over the face areas A between their inner periphery and their outer periphery.

Because the bore 1027 lies opposite to the radially inner part of face 1030 on the collar, forming an annular zone of high pressure acting of face 1030, and the space 1041 on the left-hand side on ring 1039 is in communication with low-pressure region 14, and because the pressure between face areas A will vary from the high pressure at the inner periphery to the low pressure at the outer periphery of areas A, the flange 1050 will be caused to deflect to produce an annular space between the sealing faces 1025, 1030 over sealing face areas A, which converges in the outward direction.

The net load acting to the right on the left-hand end of ring 1039 is arranged, by appropriate selection of areas, to be equal to the load acting to the left on the right-hand end of the collar 1016.

The areas are selected as follows:

Let L be the radial dimension corresponding to the area of the co-operating seal faces 1025, 1030, i.e. areas A.

Let l be the radial dimension corresponding to the net area on which the high pressure in region 13 acts, to load the face areas A together.

Let $\lambda$ be the radial dimension corresponding to the area 1047 of the ring 1039 on which the high pressure of region 13 acts to the right.

Then $L > l > \lambda$, and preferably l is approximately two thirds of L and $\lambda$ is approximately half of L, to maximize the stiffness of the fluid film between the sealing face areas A.

It will be understood that the high pressure in region 13 acting on the annular area 1047 represented by dimension $\lambda$ is the preload mentioned above.

The Applicants have found, as a result of experiments, during "running-in" operations in which the sealing face areas A are brought into contact, that due to initial thermal deflections of the ring 1039, the radially inner unsupported web-part of the flange 1050 is worn but not the radially outer edge of the ring which is supported by the part 1024 of the backplate 1020.

Figure 14A:
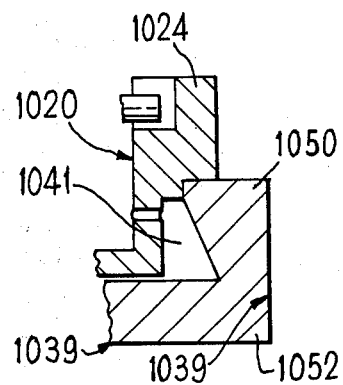
FIGS. 14a and 14b are detail view relating to FIG. 14.
Figure 14B:
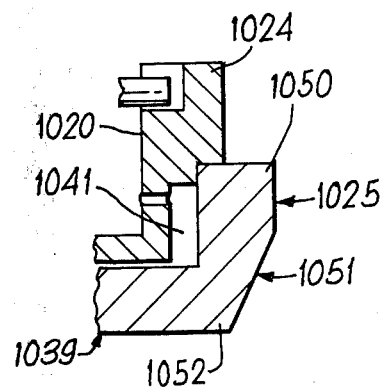

As shown in FIG. 14*b*, this produces, after the assembly has cooled to room temperature, an additional taper 1051 on the radially-inner unsupported web-part 1052 of the flange 1050. FIG. 14*a* shows one shape of the ring 1039 during the running-in process, before its final form is reached. The ring during normal operation, after running-in, is deflected to the shape shown in FIG. 14, with the minimum clearance at the outer periphery.

The other, non-deflecting, sealing face 1030 may be made of a material, e.g. carbon, which will tolerate loss by wear without serious damage, instead of the deflecting sealing face 1025.

Figure 15:
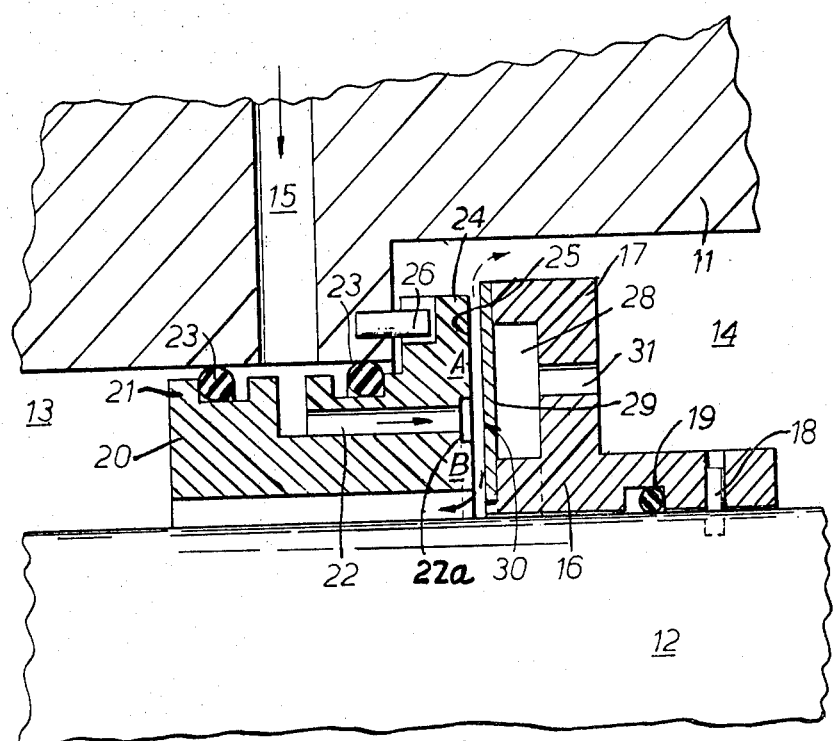
FIG. 15 shows an embodiment of face seal, according to the invention, utilizing a buffer fluid.

FIGS. 15 to 18 relate to barrier or buffer seals. The embodiment shown in FIG. 15 is the same as that of FIG. 1 except that a buffer fluid is introduced through a passage 15 in the housing 11 between the sealing rings 23. The buffer fluid is externally controlled to be at a pressure which (in this embodiment, and in all those in which buffer fluid is introduced into, as distinct from bring extracted from, the face seal) is at all times greater than that in the first region 13, which in turn is greater than that in the second region 14, usually by a substantial amount. The passage 15 is in communication with a passage 22 formed in the smaller diameter part 21 of the backplate 20 and terminates, at its end remote from the passage 15, in an annular groove 22*a* around the sealing face 25, which in this embodiment is nearer to the radially inner edge of the sealing face 25 than to the outer edge. Thus, this arrangement defines a first pair of opposed sealing face areas, designated A, at a larger diameter than the annular zone defined by groove 22*a*, and a second pair of opposed sealing face areas, designated B, at a smaller diameter than the annular zone defined by groove 22*a*.

Since the pressure of the buffer fluid supplied through passage 22 to groove 22*a* is greater than that of the sealed fluid in region 13, there will be an inward flow of buffer fluid over the face areas B of backplate 20 and collar 16 to the space within the backplate; moreover, since the pressure of the buffer fluid is substantially greater than that of the low-presure region 14, there will be an outward flow of buffer fluid over the face areas A of the backplate 20 and collar 16, between groove 22*a* and the outer periphery of the co-operating sealing faces 25, 30.

Because the groove 22*a* lies opposite to the radially-inner part of groove 28 in the collar, the elastic metal element 29 will be caused to deflect to produce an annular space between the area A of the backplate and the element 29, which converges in the direction of fluid flow, i.e. in the outward direction in this embodiment.

The convergence of the clearance between sealing faces 25, 30, from the inner periphery of area A (i.e. at the outer edge of groove 22*a*) to the outer periphery of area A (which defines the minimum clearance) will be as described for the face areas A of FIG. 1.

It will be understood that the minimum clearance is defined by the pair of opposed face areas which include the deflectable element, and it therefore follows that the clearance between the other pair of face areas will always be equal to, and preferably greater than the minimum clearance.

Figure 16:
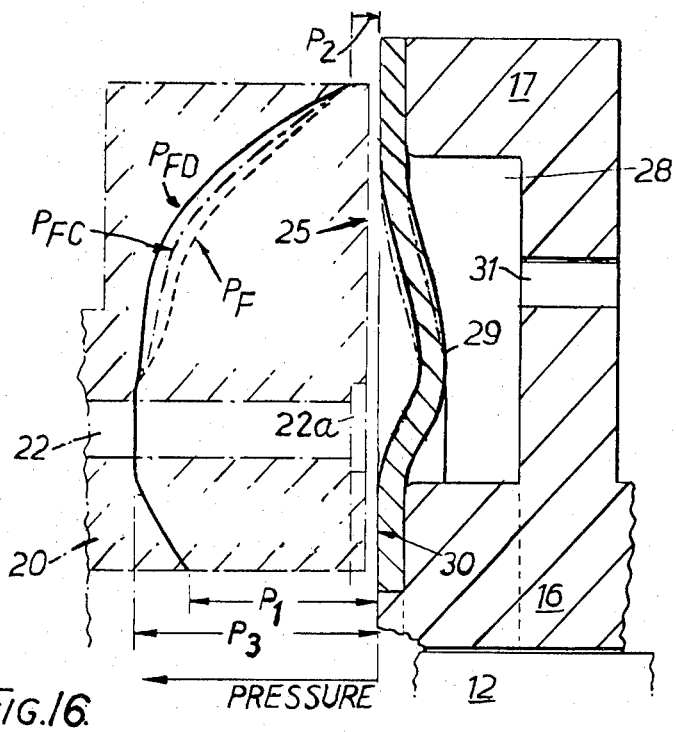
FIG. 16 is a diagram of the pressure variation over the sealing faces of FIG. 15 and shows the effects of a reduction of clearance between the sealing faces of the pressure variation.

The fluid pressure acting on the sealing face 25 of the backplate 20 in FIG. 15 under steady state operating conditions is shown by trace $P_F$ in FIG. 16, which also shows the effect of a local decrease in the clearance between the sealing faces 25, 30 and which is the same as FIG. 4 except for the changes consequential upon the introduction of a buffer fluid. In FIG. 16 the buffer pressure in groove 22a is designated $P_3$ (note that unlike certain prior proposals no restrictor is required in the buffer pressure supply in order for the seal to operate). Other than this the pressures of the fluid in the first and second regions 13 and 14 and the manner in which the buffer seal operates are as described with reference to FIGS. 3 and 4 except that the buffer fluid prohibits the leakage of fluid from region 13 to region 14 and, further, provided that the design is such that the effects of thermal expansion tend to reduce the clearance at the outer periphery, as is desirable, it will also ensure that there is always a finite clearance between the inner pair of opposed face areas B of the backplate and the collar 16. This in turn controls the flow of buffer fluid from groove 22a inwardly into region 13.

Figure 17:
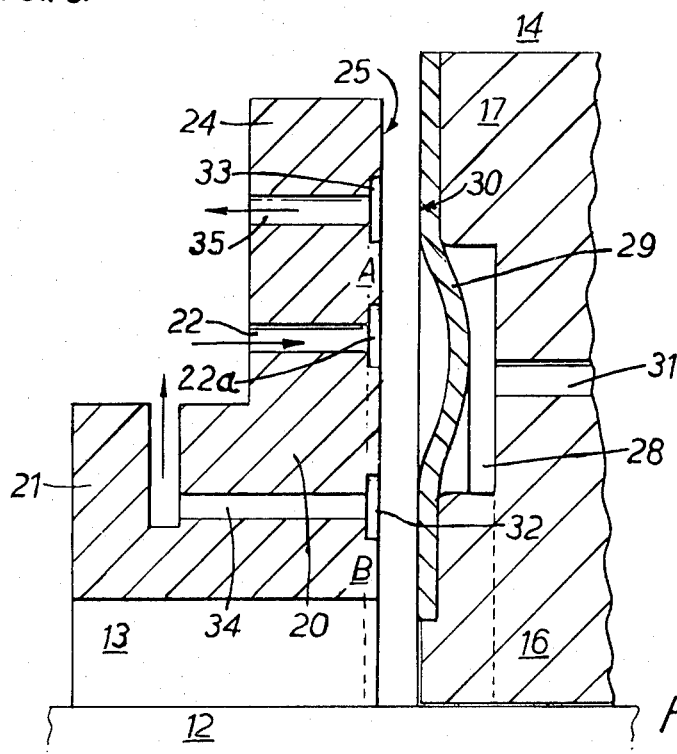
FIGS. 17 and 18 show forms of face seal which are alternatives to that of FIG. 15, under operating conditions.

The modification of FIG. 17 is a double-scavenged buffer seal, shown under steady state operating conditions. The deflectable element 29, when not under fluid pressure is flat. By comparison with FIG. 15, it will be seen that the sealing face 25 is provided with two further annular grooves 32, 33 connected to low pressures (i.e. pressures significantly below the pressures in regions 13, 14, respectively) through passages 34, 35. The inner groove 32, between groove 22a and the inner end of the face 25 is preferably connected to a pressure which is controlled to be at a constant value below that of the sealed fluid in region 13. Thus there will be a flow of mixed buffer fluid from groove 22a and sealed fluid from region 13 through passage 34, the flow of sealed fluid depending on the clearance between opposed face areas B.

The outer groove 33, between groove 22a and the outer periphery of the co-operating sealing faces, is preferably connected to a pressure controlled to be at a constant value below that of the region 14. Thus there will be flow from the region 14 inward to groove 33, and of buffer fluid from groove 22a outward to groove 33. Since groove 22a is at substantially the highest pressure in the system, and groove 33 at the lowest, it is clear that the major pressure differential, and pressure gradient, will occur across the area between these two grooves 22a, 33, and this will form the pair of opposed face areas A in this embodiment. The elastic element 29 therefore lies in this area, and will therefore deflect as described above, and control the clearance between itself and the radially outer part of opposed face areas A. This in turn will govern the clearance between the other pair of opposed face areas B between the lower lip of groove 32 and the region 13, as well as that between the face area outside groove 33 and that between grooves 22a and 32 and the respective opposed area of collar 16.

Figure 18:
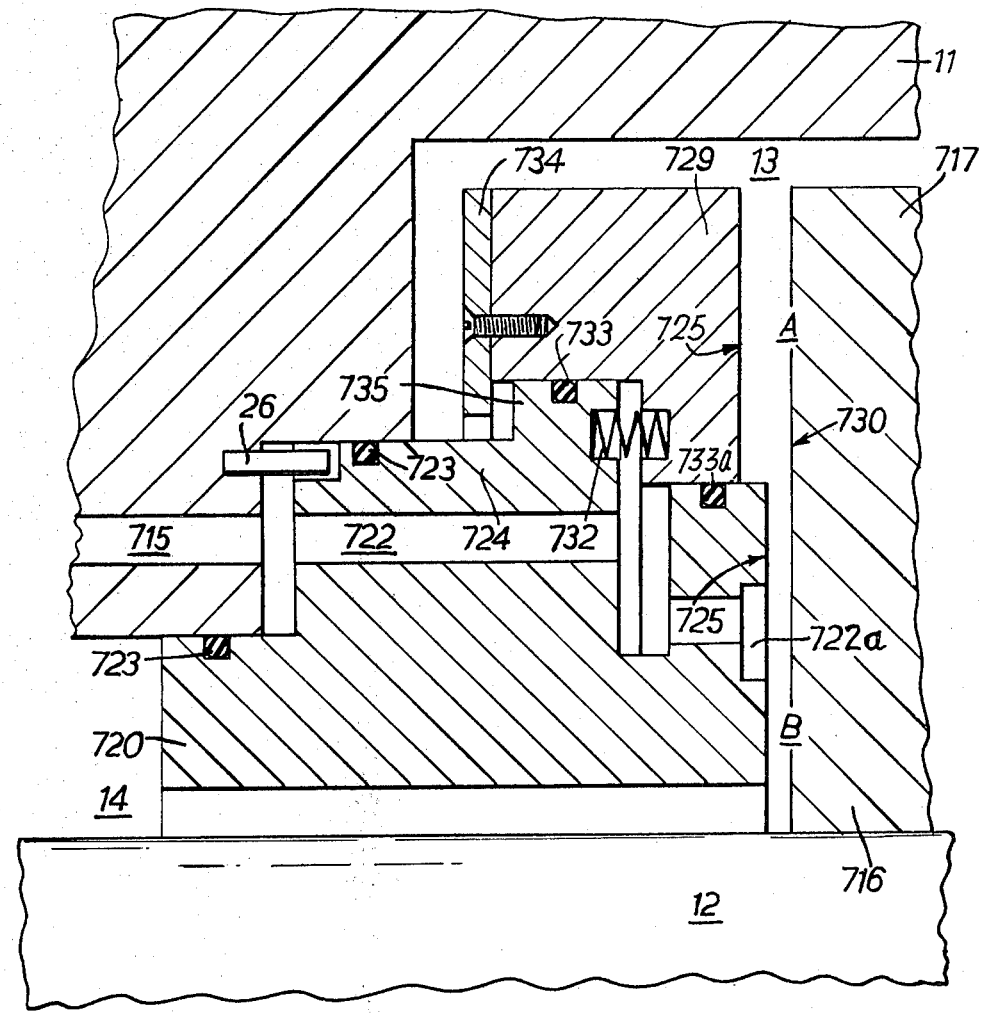

Referring now to FIG. 18, this construction is the same as that of FIG. 10 except for the provision of a buffer fluid passage 715 opening the two annular sealing rings 723 of which one is compressed in an annular groove in a cylindrical extension of backplate 720, and a communicating passage 722 terminating in an annular groove 722a, and by the omission of passage 715a and seal member 736, which is replaced by the annular seal 733a between the stepped inner face of the piston 729 and a stepped co-operating face of the backplate. In this case, instead of fluid at a pressure greater than that in either region 13 or 14 being injected between the peripheral edges of the seal, the passage 715 through the housing is connected to a point at a lower pressure than that in either of regions 13, 14, to extract fluid at a lower pressure than that in region 14 from an annular zone between the sealing faces. The larger-diameter part 724 of the backplate provides part of the sealing face 725, and the remainder of the sealing face 725 is formed by the spring-loaded piston 729 which constitutes the deflectable element, the sealing face 725 when not under fluid pressure being flat.

Since the pressure to which passage 715 is connected is lower than the pressure in either of regions 13, 14, there will be a flow of fluid inward between one pair of opposed face areas A from region 13 to the annular zone defined by groove 722a, and a flow from region 14 through the bore of the shaft and outward between another pair of opposed face areas B into groove 722a.

Thus there will be a pressure gradient in the stepped flow passage between face areas A from a maximum pressure aat the outer periphery to a minimum at annular groove 722a. Since it is arranged that there is always a greater clearance between the part of the opposed face areas A formed by piston 729 than between that part of the face areas A formed by the backplate 720 immediately outside groove 722a, the latter part will control the minimum clearance between the sealing faces 725, 730. Moreover the piston 729 and springs 732 will increase the gap between the outer part of face areas A if the minimum clearance decreases, thus increasing the pressure between these face areas, and affording a separating force to restore the original gap.

The clearance between the other pair of face areas B, between the inner periphery and the groove 722a, may be the same as in the part of the face areas A immediately outside the groove, or alternatively the part of face 725 forming one of the pair of face areas B may be set back from the part immediately outside the groove, to afford a greater clearance between the opposed face areas B.

The area on the right-hand side of piston 729, which is subjected to a lower mean pressure than the left-hand side, is so dimensioned in relation to the area on its left-hand side that the net force due to the pressure tends to move piston 729 to the left against springs 732.

Thus in this arrangement also the clearance between the sealing faces 725, 730 is controlled, leakage flow into groove 722a is restricted, and flow from the region 13 at the greater pressure to region 14 at the lower pressure is prevented.

In this arrangement the seal 733a between the backplate 720 and piston 729 may be replaced by a seal member flush with the face 725 on the piston and backplate, as described in relation to FIG. 10, if required.

It should be appreciated that the embodiments of FIGS. 5 to 9 and 11 to 14 may be modified to introduce a buffer fluid at a higher pressure than that of the high pressure region 13, along the lines of FIG. 15.

It will be apparent from the figures for minimum clearance and convergence given above that, for the sake of clarity in explaining the operation of the fluid seals, the figures are not drawn to scale, but both the minimum and maximum clearances between the sealing face areas are greatly exaggerated.

I claim:

1. A positive clearance radial face seal characterised in that at least one of its two opposed sealing faces comprises a pressure-deflectable elastic or elastically loaded element which initially provides a substantialy planar sealing face in the radial direction and which deflects, in steady state operating conditions, to provide a clearance between the sealing faces which converges in the radial direction to a minimum clearance at an annular zone between the downstream ends of the opposed sealing faces, the deflection changing with variations in the operating conditions in a manner to increase the convergence in the radial direction towards said downstream zone of the seal under the action of increased load on the seal and thereby tending to restore said steady state minimum clearance.

2. A seal according to claim 1, characterised in that the deflectable element comprises a surface member of flexible elastic material which deflects under steady state operating conditions to provide a convergence which is of generally tapering configuration.

3. A seal according to claim 2, characterised in that the surface member of flexible elastic material is annular and has reinforcing rigid annular portions extending from one face thereof, opposite to the sealing face of the member, around its internal and external peripheries respectively, and means supporting the member for rotation of its sealing face relative to the opposed sealing face, said means permitting axial movement of the one rigid annular portion relative to the other whereby to permit the flexible annulus between the reinforcing portions to deflect, the space between said flexible annulus and the supporting means being vented to the low pressure region of the seal.

4. A seal according to claim 3, characterised in that the means supporting the member is attached to one of the two relatively rotatable parts between which fluid leakage is to be restricted by an annular diaphragm which permits limited movement of the supporting means in the axial direction of the seal, the parts of the seal being so dimensioned that the fluid pressures acting on opposite ends of the supporting means and opposite sides of the diaphragm are in balance under steady state operating conditions.

5. A seal according to claim 1, characterised in that the deflectable element comprises a piston-like member which is located in a cavity in the sealing face and is movable against an elastic load by fluid pressure between the sealing faces to provide a convergence which is of stepped configuration.

6. A sealing according to claim 1, characterised in that the deflectable element comprises an abradable material of which the sealing face surface has been worn to a desired shape by rubbing during a "running-in" operation.

7. A seal as claimed in claim 1, characterised in that only one sealing face comprises a said pressure deflectable element, the other sealing face being formed by the surface of a member made of an abradable material capable of tolerating wear without serious damage.

8. A seal according to claim 1, characterised in that means are provided for introducing a buffer fluid at a pressure greater than that of the fluid in the high pressure region of the seal into an annular zone of a sealing face between its inner and outer peripheries.

9. A seal according to claim 1, characterised in that means are provided for extracting fluid from an annular zone of a sealing face between its inner and outer peripheries.

10. A seal as claimed in claim 1 characterised in that the other face of the pressure-deflectable element, which is on the other side from and faces oppositely to the face against which the leakage flow occurs, is acted on by a fluid pressure, the net load resulting from said fluid pressure and from the mean leakage fluid pressure being opposed by the forces generated by the deflection of the element.

11. A positive clearance radial face seal of which at least one of its two opposed sealing faces comprises a pressure-deflectable elastic or elastically-loaded element which deflects, in steady state operating conditions, to provide a clearance between the sealing faces which converges in the radial direction to a minimum clearance, towards the downstream zone of the seal, the deflection changing with variations in the operating conditions in a manner tending to restore the steady state clearance, said deflectable element comprising an annular flexible member having reinforcing rigid annular portions extending from one face thereof around its internal and external peripheries respectively, one of said rigid annular portions being secured to or adjacent one periphery of the end face of a mounting ring for the deflectable element and the other of said rigid annular portions is slidable relative to and sealed against the other periphery of said mounting ring, the space between the intermediate flexible annulas of the deflectable element and the end face of the mounting ring being vented to the low pressure region of the seal.

12. A positive clearance radial face seal of which at least one of its two opposed sealing faces comprises a pressure-deflectable elastic or elastically-loaded element which deflects, in steady state operating conditions, to provide a clearance between the sealing faces which converges in the radial direction to a minimum clearance towards the downstream zone of the seal, the deflection changing with variations in the operating conditions in a manner tending to restore the steady state clearance, said deflectable element being carried by a collar member which surrounds and is rotatively keyed to a shaft by an annular diaphragm which permits limited movement of said collar member in the axial direction of said shaft, and the radial face seal being so dimensioned that the fluid pressures acting on opposite ends of the collar member and opposite sides of the diaphragm are in balance under steady state operating conditions.

13. A positive clearance radial face seal of which at least one of its two opposed sealing faces comprises a pressure-deflectable elastic or elastically-loaded element which deflects, in steady state operating conditions, to provide a clearance between the sealing faces which converges in the radial direction to a minimum clearance towards the downstream zone of the seal, the deflection changing with variations in the operating conditions in a manner tending to restore the steady state clearance, said pressure-deflectable element being an annular member having rigid radially inner and radially outer annular portions supporting an intermediate annular elastic portion, the other face of said element, which is on the other side from and faces oppositely to the sealing face, being acted upon over at least part of the upstream one of said rigid annular portions by the upstream fluid pressure of the seal and being acted upon over any remaining part of said other face of said one annular portion and over said intermediate portion by the downstream fluid pressure of the seal, and the pressure-deflectable element being supported against axial movement at said other annular portion, and the net load resulting from said fluid pressures and from the mean leakage fluid pressure being opposed by the forces generated by the deflection of the element, whereby to ensure that the clearance between the sealing faces converges in the radial direction towards the downstream zone of the seal.

14. A positive clearance radial face seal comprising a pair of relatively rotatable parts, a first sealing member constrained against rotation with respect to one of said parts, a second sealing member constrained against rotation with respect to the other of said parts, said first and second sealing members having co-operating opposed sealing faces, which resist fluid flow between said sealing faces from a high pressure region to a low pressure region, at least one of said sealing faces comprising a pressure-deflectable elastic or elastically-loaded element which in its unstressed condition provides a sealing face which is substantially planar in the radial direction and which, in steady state operating conditions, deflects to provide a clearance between said sealing faces which converges in the downstream radial direction to a minimum clearance at an annular zone between the downstream ends of the co-operating sealing faces, said pressure-deflectable element changing its deflection with variations in the operating conditions, in the sense of increasing the convergence in the downstream direction with increase of the pressure difference across the sealing faces and decreasing said convergence with decrease of said pressure difference, thereby tending to restore said minimum clearance to its steady state value, and including resilient pre-load means opposing deflection of the upstream end of the pressure-deflectable element.

15. A face seal as claimed in claim 14, wherein said resilient pre-load means opposing deflection of said upstream end of the pressure-deflectable element includes a fluid pressure load acting on said element.

16. A face seal as claimed in claim 14, wherein said resilient pre-load means opposing deflection of said upstream end of the pressure-deflectable element includes spring means acting on said element.

* * * * *

UNITED STATES PATENT AND TRADEMARK OFFICE
CERTIFICATE OF CORRECTION

PATENT NO. : 4,290,613

DATED : September 22, 1981

INVENTOR(S) : Peter Andrew James Scott

It is certified that error appears in the above—identified patent and that said Letters Patent is hereby corrected as shown below:

Column 2, line 63, "shaft 12. Th" should be --shaft 12. The--.

Column 5, line 25, after "own", insert --inner--.

Column 5, line 63, change "spring" to --springs--.

Column 6, line 3, change "an" to --and--.

Column 6, line 51, change "its" to --it--.

Column 7, line 1, change "that" (first occurrence) to --than--.

Column 7, line 67, change "834" to --843--.

Signed and Sealed this

Twenty-sixth Day of January 1982

[SEAL]

Attest:

GERALD J. MOSSINGHOFF

Attesting Officer

Commissioner of Patents and Trademarks